UNITED STATES PATENT OFFICE.

JOHANN ADELSBERGER AND HUGO FRIEDMANN, OF VIENNA, AUSTRIA-HUNGARY, ASSIGNORS TO SIMON WECHSLER, OF VIENNA, AUSTRIA-HUNGARY.

PRINTING COLOR FOR LITHOGRAPHIC OR METALLOGRAPHIC PRINTING.

SPECIFICATION forming part of Letters Patent No. 710,233, dated September 30, 1902.

Application filed July 5, 1901. Serial No. 67,185. (No specimens.)

*To all whom it may concern:*

Be it known that we, JOHANN ADELSBERGER and HUGO FRIEDMANN, subjects of the Emperor of Austria-Hungary, residing at Vienna, in the Province of Lower Austria, in the Empire of Austria-Hungary, have invented certain new and useful Improvements in Printing Colors for Lithographic or Metallographic Printing; and we do hereby declare the following to be a full, clear, and exact description of the invention, such as will enable others skilled in the art to which it appertains to make and use the same.

Our invention consists in a composition of matter suitable for admixture with or use for or in the manufacture of printers' ink of any desired color for lithographic or metallographic printing.

In the use of printers' ink embodying our said composition of matter the washing or wiping of the stone or plate after each impression can be dispensed with, and this in our opinion is due to the tendency of the blank spaces of the stone or plate to attract water from the substances of the composition containing such and especially from the glycerin, resulting in the formation of an aqueous film on said blank spaces, which repels the fatty ink. This of course is a mere theory, while practice has conclusively shown that inks embodying our composition are suitable for continuous dry printing.

The composition of matter referred to consists of varnish, glycerin, a salt of the alkalies, tartar, and a volatile resinous oil with or without a pigment, according as the composition is used for or in the manufacture of printers' ink or as a diluent for such ink.

The relative proportions of the constituents of the composition may vary within or about within the following limits: varnish, two hundred and seventy to three hundred and fifty parts, by weight; glycerin, five hundred to five hundred and fifty parts, by weight; salt of an alkali, twelve to twenty parts, by weight; tartar, one hundred and fifty to one hundred and eighty parts, by weight; resinous volatile oil, two hundred and seventy to three hundred and fifty parts, by weight, the resinous oil serving as a binder to bind the glycerin to the varnish.

Although we do not desire to limit our invention to the use of any particular varnish or to the use of any particular salt of the alkalies or to the use of any particular resinous volatile oil, we give preference to linseed-oil varnish, soda, and turpentine.

For general purposes, either as a diluent for printers' inks or for use for or in the manufacture of such inks, we have found the following proportions of constituents most advantageous: varnish, two hundred and eighty parts, by weight; glycerin, five hundred and forty parts, by weight; salt of an alkali, six parts, by weight; tartar, fourteen parts, by weight; volatile resinous oil, one hundred and sixty parts, by weight.

As regards the proportion of the composition to be used in the manufacture of printers' inks we may state that this depends in a measure on the quality of the pigment and may vary from two hundred grains to six hundred grains per kilo of pigment, the general rule applicable being that the proportion of the composition to be used increases in proportion to the decrease in the quality of the pigment and varies within or about within the limits stated.

As regards the proportion of the composition to be mixed with a printers' ink as a diluent this depends on the quality of the work and the quality of the paper and is to be determined by the printer, as usual, while this dilution of an ink manufactured or prepared with the above-described composition of matter may be effected by the addition of turpentine or glycerin and is also to be determined by the printer, as usual.

Having thus described our invention, what we claim as new therein, and desire to secure by Letters Patent, is—

1. A composition of matter consisting of varnish, glycerin, a salt of the alkalies, tartar and a volatile resinous oil, for the purpose set forth.

2. A composition of matter consisting of varnish, glycerin, a salt of the alkalies, tartar, a volatile resinous oil and a pigment, for the purpose set forth.

In testimony that we claim the foregoing as our invention we have signed our names in presence of two subscribing witnesses.

JOHANN ADELSBERGER.
HUGO FRIEDMANN.

Witnesses:
JOSEF RUBRESCH,
ALVESTO S. HOGUE.